April 28, 1964 W. DEPMER 3,131,202
PROCESS AND APPARATUS FOR THE CONTINUOUS EXTRACTION OF OILS
AND SOLUBLE SUBSTANCES FROM SOLID MATERIALS
Filed Jan. 24, 1961 7 Sheets-Sheet 1
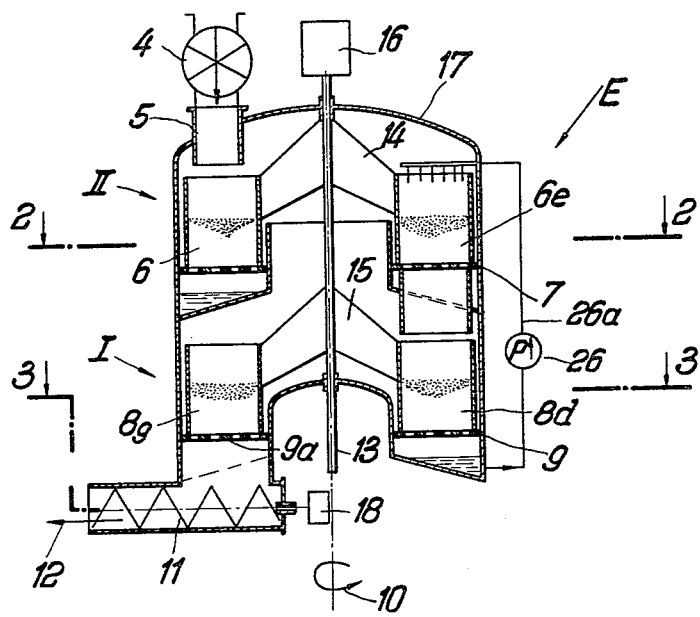
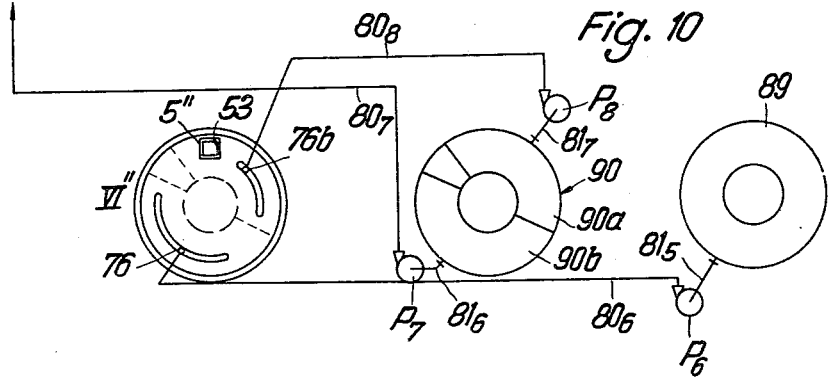
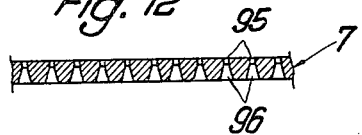
Inventor:
WILHELM DEPMER
BY
Michael S. Striker
his ATTORNEY

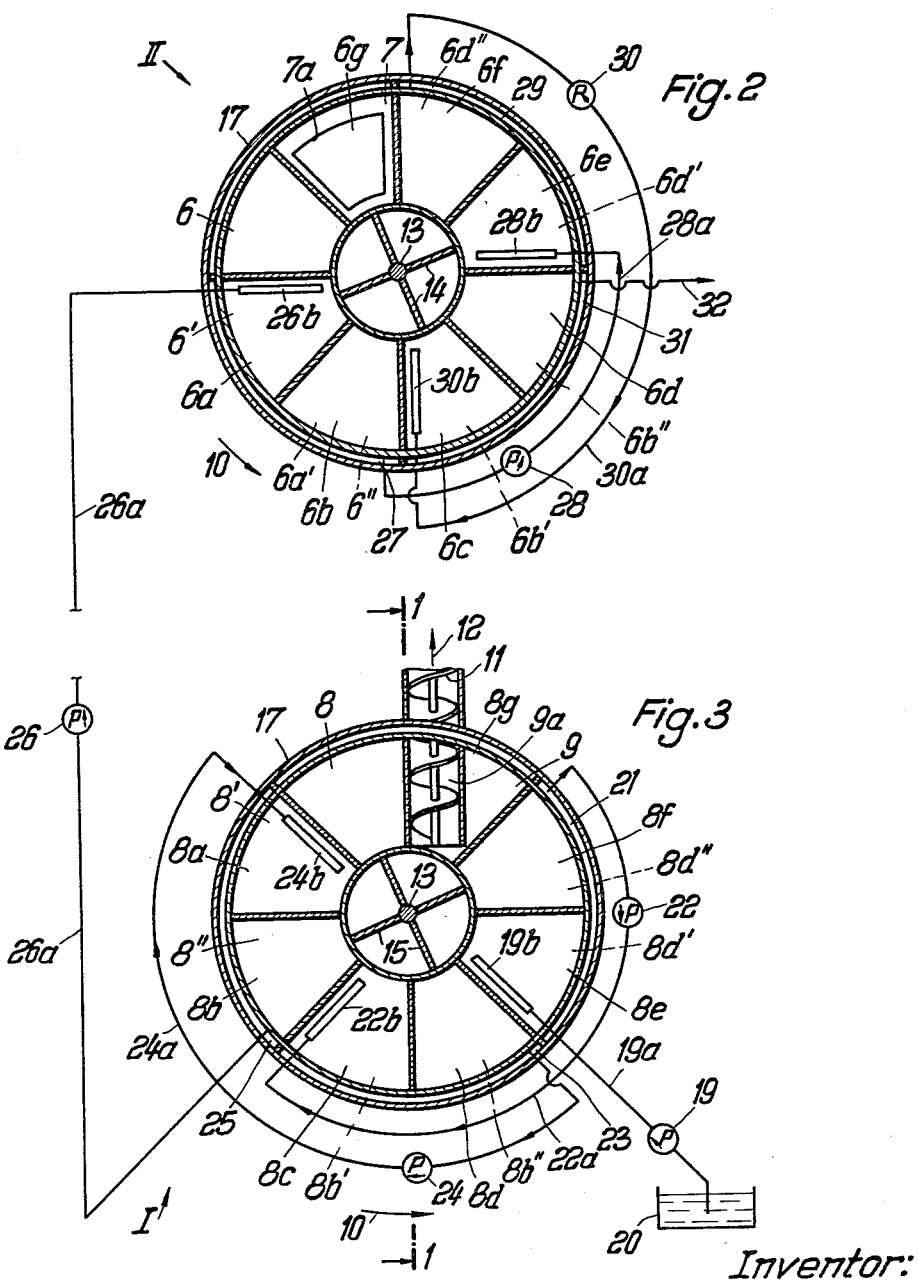

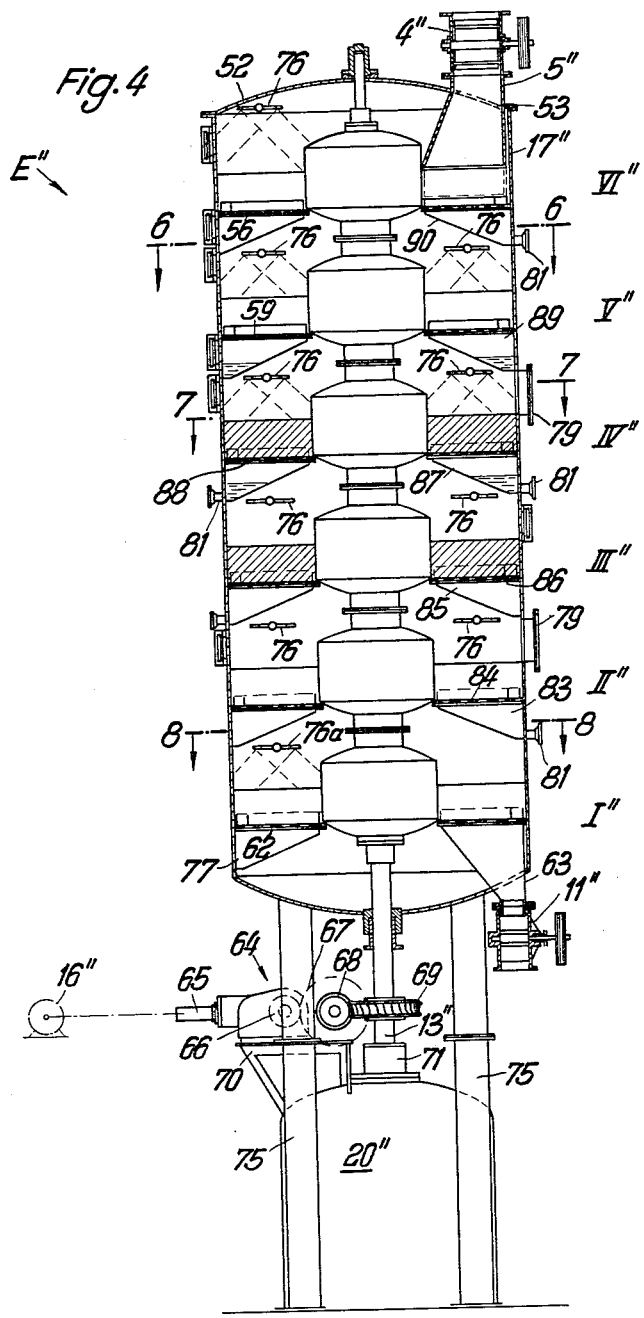

April 28, 1964 W. DEPMER 3,131,202
PROCESS AND APPARATUS FOR THE CONTINUOUS EXTRACTION OF OILS
AND SOLUBLE SUBSTANCES FROM SOLID MATERIALS
Filed Jan. 24, 1961 7 Sheets-Sheet 4
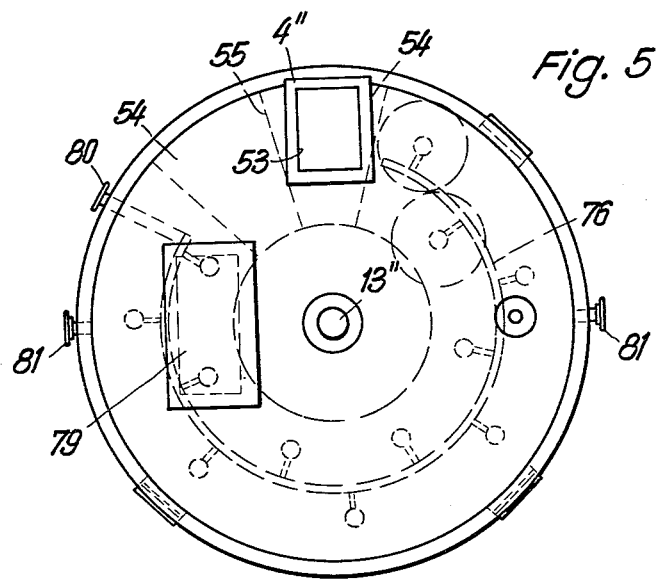
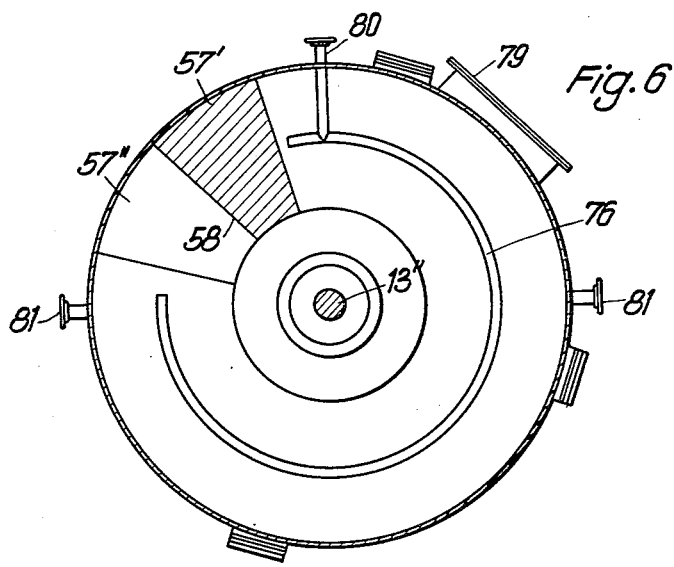
Inventor:
WILHELM DEPMER
BY
Michael S. Striker
his ATTORNEY

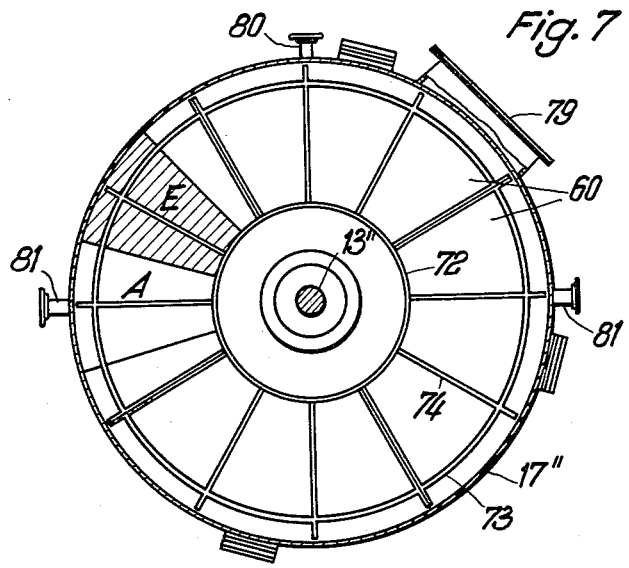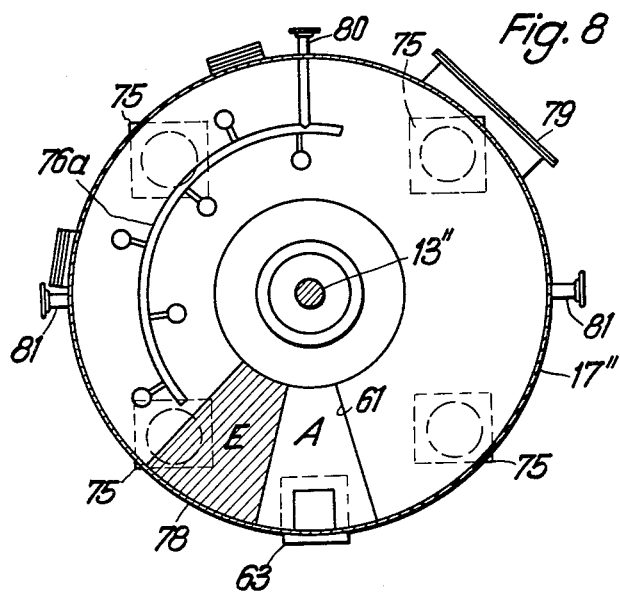

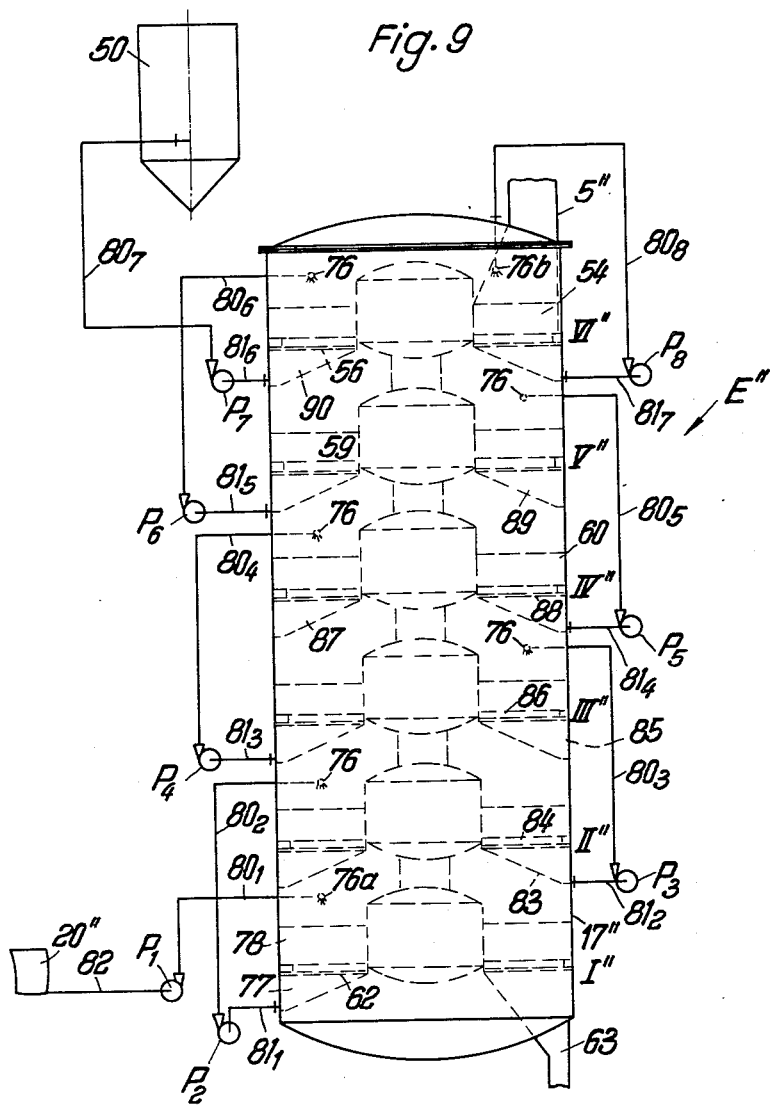

United States Patent Office 3,131,202
Patented Apr. 28, 1964

3,131,202
PROCESS AND APPARATUS FOR THE CONTINUOUS EXTRACTION OF OILS AND SOLUBLE SUBSTANCES FROM SOLID MATERIALS
Wilhelm Depmer, Kielmannseggstr. 86, Hamburg-Wandsbek, Marienthal, Germany
Filed Jan. 24, 1961, Ser. No. 84,664
14 Claims. (Cl. 260—412.8)

The present invention relates to a process and to an apparatus for the continuous extraction of oils and soluble substances from solid materials with the help of solvents. More particularly, the invention relates to improvements in so-called carrousel or cell type solvent extractors in which the extraction takes place while the solid material is advanced in a number of sector-shaped cells about a vertical axis.

Continuous solvent extractors of the cell or carrousel type are known. For example, German Patent No. 889,-140 discloses an extractor in which a number of bottomless cells travels above a grate and in which the grate is provided with an opening through which, after completing a nearly full revolution, the solid material contained in the individual cells may be discharged into a residue conveyor whose screw advances the residue to further processing stations. The solvent and partially concentrated miscella are caused to flow through the permeable bed of material filling the individual cells, and the final effluent, i.e. finished miscella, is led to the miscella tank. The advantage of such extractors is that they insure a very satisfactory extraction, the simplicity of their construction, and low maintenance cost. However, when it is desired to increase the capacity of such units, their diameter must be increased to such an extent as to render their transportation on normal conveyances either difficult or plain impossible.

An important object of the invention is to provide a cell type extractor whose diameter need not be increased if it is desired to increase its capacity and which, therefore, may be readily transported and installed without requiring specially built conveyances for such purposes.

Another object of the invention is to provide an extractor of the just outlined characteristics whose capacity may be increased well beyond the capacity of largest cell-type extractors of presently known design.

A further object of the invention is to provide a cell-type extractor which is constructed and assembled in such a way that all zones of solid material are always thoroughly contacted by the solvent or by the partially enriched miscella.

Still another object of the invention is to provide an apparatus of the above outlined characteristics whose capacity may be increased or reduced in a very simple manner if the circumstances should so require.

A concomitant object of the invention is to provide a cell type extractor in which the channeling of solid material, such as would prevent the solvent or miscella from coming into full contact with all zones of the material in each cell of the apparatus, is effectively avoided in a very simple manner.

An additional object of the instant invention is to provide a novel process for the recirculation of solvent and/or miscella in a cell type extractor of the above outlined characteristics.

Still another object of the present invention is to provide a process for the complete extraction of oils and soluble substances from granular, flocculent and like solid materials within short periods of time and at low ratios of solvent to feed.

The invention resides essentially in the recognition that the capacity of a cell type extractor may be increased in a very simple manner without increasing its transverse dimensions if the extractor is built in two or more stages which are disposed one above the other. In other words, instead of increasing the capacity of a cell-type extractor by increasing its diameter from a practical magnitude to a magnitude which would render the apparatus extremely bulky, hard to install, and even harder to transport from the locale of manufacture to the locale of actual use, the improved extractor comprises two or more operatively connected tiers or stages disposed one above the other in such a manner that the material introduced into the cells of the uppermost tier is caused to describe a nearly complete circle, is thereupon discharged into the tier therebelow to again complete a nearly full circle, and so forth until it reaches the lowermost stage or tier from which it is discharged as residue into the customary screw conveyor or the like. An important feature of the invention is that the travel of material into the uppermost tier, into the subsequent tiers, and into the discharge or residue conveyor may occur exclusively by gravity flow, only the circulation of beds in each stage being brought about by a source of power, such as an electric motor or the like. Since the material contained in the cells located in the uppermost stage of my multi-stage extractor must enter at least one additional cell before being discharged from the apparatus, it is sufficiently intermixed during gravitational descent into a lower cell so that each of its zones comes into intimate contact with pure solvent or with partially finished miscella.

Another important feature of the invention resides in the provision of a novel process for the circulation of solvent and/or miscella countercurrently to the advance of solid material in a vertical direction, and in part concurrently with and in part countercurrently to the advance of material in the individual tiers. In such manner, one can attain a very high concentration of finished miscella, a comparatively low solvent consumption, and a full contact of all zones of solid material with solvent and/or miscella by simultaneous prevention of channeling by solvent or miscella, i.e. the material beds filling the individual cells of the apparatus are prevented from forming distinct channels for the descent of the liquid such as would prevent a contact between the liquid and all zones of the material beds.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is a schematic axial section through a two-stage continuous cell type extractor embodying my invention, the section through the upper stage of FIG. 1 being taken along the line 1a—1a of FIG. 2 and the section through the lower stage of FIG. 1 being taken along the line 1b—1b of FIG. 3, as seen in the direction of arrows;

FIG. 2 is a horizontal section through the upper stage of the extractor, this section being taken along the line 2—2 of FIG. 1, as seen in the direction of arrows;

FIG. 3 is a horizontal section through the lower stage of the extractor, this section being taken along the line 3—3 of FIG. 1, as seen in the direction of arrows;

FIG. 4 is a schematic vertical section through a six-stage extractor, complete with driving motor and solvent tank;

FIG. 5 is a top plan view of the six-stage extractor;

FIG. 6 is a horizontal section taken along the line 6—6 of FIG. 4, as seen in the direction of arrows;

FIG. 7 is a horizontal section taken along the line 7—7 of FIG. 4, as seen in the direction of arrows;

FIG. 8 is a horizontal section taken along the line 8—8 of FIG. 4, as seen in the direction of arrows;

FIG. 9 is a schematic elevational view of the six-stage extractor showing the system of conduits and pumps for conveying solvent and miscella through the individual stages;

FIG. 10 is a schematic exploded view of the uppermost group of cells and of two uppermost liquid-collecting compartments forming part of the six-stage extractor;

FIG. 12 is an enlarged section through a preferred form of the grate which may be utilized in my multistage extractor.

Figure 11:
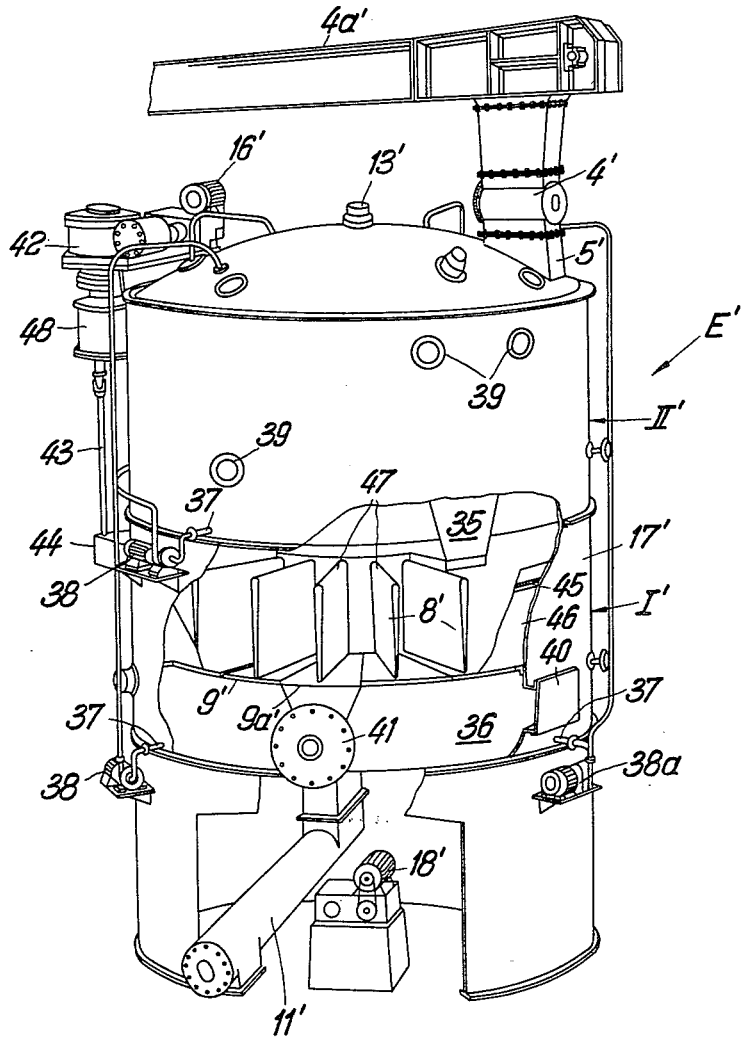
FIG. 11 is a perspective view of a slightly modified two-stage extractor with a portion of its mantle broken away.

Referring now in greater detail to the illustrated embodiments, and first to FIGS. 1 to 3, there is shown a two-stage extractor E which comprises an upper stage II and a lower stage I. The solid material from which oil or a soluble substance is to be extracted is introduced at a feeding station including a liquid-tight combined feeding and metering device here shown as a hopper 4 which feeds a substantially vertical intake pipe or duct 5, the latter delivering the material into a sector-shaped cell 6 in the upper stage II. In the illustrated embodiment, the upper tier or stage comprises eight cells numbered 6–6g, as is clearly shown in FIG. 2. The stationary bottom plate or grate 7 beneath the cells 6–6g of the upper stage is perforated, and the cells 6–6g rotate in the direction indicated by the arrow 10, so that the material is entrained along the grate 7 and, before completing a full revolution (compare FIGS. 2 and 3) is discharged into a cell 8 located in the lower stage I. This lower stage also comprises eight cells numbered 8–8g (see FIG. 3), the cell 8 being located beneath the cell 6g of the upper stage II. The grate 7 of the upper stage II is formed with an evacuating opening 7a which is rearwardly adjacent to the point where the duct 5 delivers untreated material into the cell 6, it being assumed that the cell 6 momentarily assumes the position of FIG. 2. The cells 6–6g successively receive metered quantities of material while passing beneath the duct 5, and successively discharge their contents while passing above the opening 7a of the stationary upper grate 7, each of the cells 6–6g completing a nearly full revolution before discharging its contents into the aligned cell of the lower stage I. Thus, since the extractor E of FIGS. 1 to 3 is shown as comprising eight cells in its upper stage II and eight cells in its lower stage I, the material received say in the cell 6 will travel through seven eighths of a circle before being discharged into the cell 8a of the lower stage. In other words, each cell in the upper stage II retains the material introduced therein through the duct 5 while it completes a full revolution minus its angular width. The procedure is then repeated in the lower stage I wherein say the cell 8, after having received partially treated material from the cell 6g of the upper stage II, completes a nearly full revolution above the stationary lower perforated grate 9 before discharging the desolventized material through an opening 9a and into a discharge conveyor 11 which removes the residue in the direction indicated by the arrow 12.

The means for driving the cells 6–6g and 8–8g comprises a vertical main drive shaft 13 which is connected with the inner walls of selected cells in stages II, I by arms 14, 15, respectively, and a driving motor 16 which may be mounted at the top of the substantially cylindrical upright extractor mantle or housing 17. The discharge or residue conveyor 11 may be driven by a second motor 18 to advance the residue to a desolventizer toaster or the like, not shown in the drawings, which removes from the residue all remaining traces of solvent.

The solvent, e.g. hexane, is circulated in the following manner: Fresh solvent is introduced by a stage pump 19 into the cell 8d located in the lower stage I (see FIG. 3). It should be kept in mind that the extractor E rotates in the direction of the arrow 10 and that, though the discharge end of the supply conduit 19a connected to the pressure side of the stage pump 19 is shown located above the cell 8e, in the operating step to be presently described the solvent is actually discharged onto the bed of material in the cell 8d because the latter rotates in anticlockwise direction to move into the position 8d' and to advance its contents beneath the multiapertured spray nozzle 19b connected with the discharge end of the conduit 19a. The pump 19 draws solvent from a source schematically illustrated as a tank 20. As the cell 8d continues its advance in the direction of the arrow 10 through a distance equal to its angular width to assume the position 8d'' shown in FIG. 3 (previously occupied by the cell 8f), the solvent passes through the permeable bed of material contained therein and is discharged through the perforations of the lower grate 9 into a collecting receptacle or compartment 21.

In the meantime, a second stage pump 22 continuously draws from the compartment 21 partly enriched miscella discharged through the permeable bed of material contained in the preceding cell 8e and delivers this miscella to the material located in the cell 8b which, in the meantime, moves into the position 8b' shown in FIG. 3 as occupied by the cell 8c. It will be noted that the supply conduit 22a connected to the pressure side of the stage pump 22 delivers miscella to a spray nozzle 22b located above the cell 8b when the latter moves to the position 8b'. As the cell 8b thereupon advances to the position 8b'' shown in FIG. 3 as occupied by the cell 8d, miscella seeps through the permeable bed of material contained in its interior and through the perforations of the lower grate 9 to be collected in the compartment 23 located thereebeneath. In the meantime, a further stage pump 24 draws from the compartment 23 miscella discharged by the material in the cell 8c in the preceding stage of the extracting operation and delivers miscella through a supply conduit 24a and through a spray nozzle 24b onto the permeable bed of material contained in the cell 8 which, in the meantime, advances into the position 8' shown in FIG. 3 as occupied by the cell 8a. The cell 8 then advances to the position 8'' and discharges enriched miscella through the perforations of the lower grate 9 and into a compartment 25. A pump 26 has its suction side connected to the compartment 25 and delivers enriched miscella into the upper stage II, and more particularly into the cell 6 in the latter's position 6' shown in FIG. 2 as occupied by the cell 6a. The enriched miscella pumped through the supply conduit 26a and discharged by the spray nozzle 26b onto the contents of the rotating cell 6 (position 6') was discharged into the compartment 25 by the bed of material in the cell 8a in the preceding operating step. The cell 6 then advances to the position 6'' and discharges enriched miscella into a compartment 27, the miscella passing through the perforations of the upper grate 7. This compartment 27 is connected with the suction side of a stage pump 28 which conveys miscella through a supply conduit 28a and through a spray nozzle 28b onto the contents of the cell 6d as the latter advances to the position 6d'. It will be understood that at least a portion of enriched miscella discharged by the nozzle 28b onto the permeable bed of material in the cell 6d was delivered to the compartment 27 by the cell 6a as the latter was advanced to the position 6a' shown occupied by the cell 6b.

The cell 6d then continues its advance in the direction of the arrow 10 and discharges enriched miscella into a compartment 29 beneath the perforated upper grate 7. This compartment 29 is connected with the suction side of a stage pump 30 which causes miscella to flow through the supply conduit 30a and through a spray nozzle 30b onto the bed of material contained in the cell 6b as the latter advances to the position 6b'. The cell 6b then moves to the position 6b'' and discharges miscella through the perforations of the upper grate 7 into a compartment 31, this compartment being connected with a discharge pipe 32 which evacuates finished miscella to a next processing station or to the miscella tank.

It will be seen that partly finished miscella withdrawn by the pump 26 from the lower stage I is delivered to the cell 6 in the upper stage II immediately after this cell leaves the filling station (shown in FIG. 2 as occupied by the cell 6). As stated before, the cell 6 receives partly enriched miscella as it advances to the position 6'. After each introduction of solvent or miscella into a cell of the lower stage I, the miscella travels in the same direction as the solids (arrow 10) until each cell completes an angular movement equal to its angular width, whereupon the enriched miscella is moved counter to the direction of the arrow 10 (pumps 22, 24) and is delivered into a cell separated by at least one intermediate cell from that cell of the lower stage through which miscella was last passed. Any small particulate matter which is entrained by partly enriched miscella is filtered away during the consecutive passages of miscella through the solids located in the cells of the upper and lower stages.

In the upper stage, miscella travelling with a cell in the direction of the arrow 10 is subsequently circulated in the same direction (pump 28) to be discharged into a cell spaced by several cells from the cell 6 (position 6') through which the miscella was passed in the preceding step, and is subsequently circulated in a direction counter to the direction of the arrow 10 (pump 30) to enter a cell spaced by at least one cell from the cell 6. It is preferred to withdraw finished miscella after it has passed through a bed of material which was subjected at least once to the action of partly finished miscella. Thus, finished miscella withdrawn through the discharge pipe 32 last passes through the bed of material in the cell 6b which was previously subjected to the action of partly finished miscella discharged by the nozzle 26b. This insures that the solids entrained by miscella passing through a batch of newly introduced material are filtered away before finished miscella leaves the extractor.

The tubular spray nozzles 19b, 22b, 24b, 26b, 28b and 30b insure a uniform distribution of solvent or miscella onto the beds of material received in the cells therebeneath. As shown in FIGS. 2 and 3, the angular width of each compartment equals the angular width of two adjacent cells. No compartment is necessary below the opening 7a and the duct 5 in the upper stage II, and below the opening 9a and the opening 7a in the lower stage I.

A very important advantage of the extractor E is that the material discharged by the hopper 4 into the cells of the upper stage II is thoroughly intermixed or kneaded before it can leave the apparatus. Thus, and assuming that some channeling develops in the beds of material received in the upper cells 6–6g, such channeling has little or no effect on the efficiency of the extraction because, during its descent by gravity flow into the cells 8–8g, the partially treated material is thoroughly mixed or kneaded so that each of its zones comes into intimate contact with solvent and with enriched miscella discharged by the nozzles 19b, 22b and 24b. It will be readily understood that, in a one-stage extractor, such mixing of material is not possible since the bed of material received in a cell is not subjected to any mixing action while it travels in a circular path from the duct 5 to the opening 7a or from the opening 7a to the opening 9a. Of course, the division of each stage into a number of sector-shaped cells also contributes to the prevention of channeling so that the division of material into individual sector-shaped beds and subsequent mixing of material during its descent through the openings 7a insure full contact of all zones with solvent or miscella before the residue is discharged through the opening 9a and into the conveyor 11.

FIG. 11 illustrates a slightly modified two-stage extractor E' which comprises an upper stage II' and a lower stage I', each of these stages being formed with a large number of cells. Only the cells 8' of the lower stage I' are visible, and it will be noted that this stage comprises 16 cells. Also, the opening 9a' of the composite lower grate 9' is angularly spaced from the funnel 35 through a distance greater than the angular width of a single cell 8'. The funnel 35 communicates with the evacuating opening of the upper grate (not shown). The opening 9a' permits gravitational descent of residue into the screw conveyor 11' which is driven by a motor 18'. It will be noted that the bottom walls of miscella-collecting compartments 36 below the lower grate 9' are inclined outwardly and downwardly in a direction toward the mantle 17' so that the miscella accumulates in the proximity of intake ends of discharge conduits 37 which convey miscella to the stage pumps 38. The mantle 17' is provided with several observation windows 39 and with one or more manhole covers 40. A suitable air lock 41 is mounted between the opening 9a' and the conveyor 11'.

The means for introducing untreated solid material into the cells of the upper stage II' comprises a channel 4a', a hopper 4' and an intake pipe or duct 5'.

An important difference between the extractors E and E' is that the latter is rotated by a system which includes an electric motor 16', a reducing gearing 42, and individual drives for the stages I', II'. The drive for the lower stage I' comprises a connecting shaft 43 which is rotated by the reducing gearing 42, a pinion which is connected to the shaft 43 and is received in a casing 44, and a ring gear 45 which meshes with the aforementioned pinion and is secured to the annular skirt or wall 46 forming part of the lower stage I' and surrounding the radial partitions 47 which separate the cells 8' from each other. The upper drive is of similar construction; it comprises a pinion in the casing 48 and a ring gear (not shown) which is secured to the annular skirt of the upper stage II'. The coaxial shaft 13' merely serves as a means for centering the rotary components of the two stages. The arrangement of FIG. 11 is often preferred because it requires a smaller motor and because the two stages are better balanced in the mantle 17'. Furthermore, since the rotation of the stages I', II' is very slow, say one revolution per 40–80 minutes, the speed reduction attainable with a drive including a large ring gear and a small pinion is much simpler than the speed reduction necessary to the drive the shaft 13' at a requisite angular speed.

The operation of the extractor E' is analogous to the operation of the extractor E, excepting, of course, that the extractor E' may comprise a larger number of stage pumps 38 in the event that it is necessary to recirculate miscella more frequently in each of the two tiers or stages. On the other hand, it is equally possible to introduce miscella into each third or fourth cell so that the number of spray nozzles need not be substantially increased beyond that shown in FIGS. 2 and 3. As the number of cells in each stage increases, the likelihood of channeling is reduced accordingly.

The pump 38a performs the function of the pump 26 shown in FIG. 3, i.e. it delivers enriched miscella from a compartment 36 in the lower stage I' to a nozzle above one or more cells in the upper stage II'. As shown, the entire extractor E' is supported by the annular lower edge portion of its mantle 17'.

Referring now to FIG. 4, there is shown a six-stage extractor E'' whose construction is somewhat different from the construction of extractors E and E'. The main difference is that the solvent or miscella is not recirculated between the cells in a single stage or tier but solely between the stages themselves, i.e. the solvent contained in a tank 20'' is sprayed onto the material beds contained in the lowermost stage I'', is thereupon collected in the compartment or compartments located below the cells of the lowermost stage and is sprayed onto the material in the cells of the second stage II'. The recirculation is continued in the same sense in the stages III'', IV'', V'' and VI'', and the finished miscella withdrawn from the compartment of the uppermost stage VI" is then led away into the miscella tank 50, shown in FIG. 9. This tank is connected with a discharge pipe 51 leading to a miscella filter, not shown.

The cover 52 of the mantle 17" is formed with an intake opening 53 for a duct or intake pipe 5" which receives metered quantities of untreated material from a hopper 4", so that the duct 5" may consecutively fill the cells 54 in the uppermost stage VI" (see FIG. 5). It is assumed that the cells 54 rotate in clockwise direction, as viewed in FIG. 5, and that each of these cells performs a nearly complete revolution before it can discharge its contents through an opening 55 formed in the stationary uppermost grate 56. The material consecutively discharged by the cells 54 is received in the cells of the stage V" (see FIG. 6), and these cells again discharge the material through an opening 58 of the stationary second grate 59 so that the material enters the cells 60 in the stage IV" (see FIG. 7). It will be noted that, say, the cell 57' of the stage V' conveys the material through an angle of nearly 360 degrees before it can discharge the material through the opening 58 when it assumes the position occupied in FIG. 6 by the cell 57". The material then advances through the stages III", II" and I" in the same manner, and is finally discharged through the opening 61 (see FIG. 8) of the lowermost grate 62 to enter a funnel 63 leading to the discharge or residue conveyor 11".

The system for rotating the cells of the extractor E" is shown in FIG. 4. This system comprises an electric motor 16" which drives the input shaft 65 of a reducing gearing 64, the shaft 65 being drivingly connected with a pinion 66 which meshes with a larger-diameter gear 67. The shaft of the gear 67 carries a coaxial worm 68 which meshes with a worm wheel 69 mounted on the main drive shaft 13". The shaft 13" is drivingly connected with the rotary components in the stages I"–VI" so that the cells in each of these stages are driven at the same speed. For example, the motor 16" drives the input shaft 65 at such a speed that the latter completes 48 revolutions per minute, and the transmission ratio between the shaft 65 and the pinion 66 is 10:1. The ratio between the pinion 66 and the gear 67 is 2:1, i.e. the worm 68 performs 2.4 revolutions per minute. It is also assumed that the worm wheel performs 4.8 revolutions per hour, i.e. a simple calculation will show that the material will be retained in each stage for a period of about 11 minutes provided that each stage comprises 12 cells (see FIG. 7). Thus, as the number of tiers or stages in an extractor increases, the rotational speed of the cells also increases so that, instead of remaining in each stage for comparatively long periods of time, the material is more frequently subjected to a mixing or kneading action as it passes through the openings in the vertically spaced stationary grates of the individual stages.

In the embodiment of FIG. 4, the reducing gearing 64 is mounted on a bracket 70 which is carried by the solvent tank 20", and the lower end of the main drive shaft 13" is supported in a thrust bearing 71 which is also carried by the tank 20". The exact construction of the connections between the main drive shaft 13" and the components which define the cells in the individual stages I"–VI" is not shown in the drawings as it forms no part of my invention. As a rule, the main drive shaft is drivingly connected with annular inner skirts 72 (see FIG. 7) which latter, together with the annular outer skirts 73 and radial partitions or walls 74, define the individual cells of the respective stages.

The mantle 17" is supported by four uprights 75 so that the reducing gearing 64 is readily accessible. By way of example, the diameter of the mantle may be 2.4 meters, the overall height of the extractor E" is 8.34 meters, the distance between the individual grates is 1 meter, and the diameter of the miscella tank is 1.67 meters.

In each of the stages I"–VI", there is provided a preferably arcuate spray nozzle 76 which is disposed in a horizontal plane and which sprinkles miscella or solvent onto the permeable beds of material in the individual cells. As is shown in FIGS. 5 and 6, the nozzles may extend along a nearly complete circle though it is normally sufficient to sprinkle miscella or solvent onto the material contained in only one-half of the total number of cells provided in a given stage, i.e. the nozzle 76 of FIG. 5 may deliver miscella only to the cells momentarily located in the right-hand half of the uppermost stage VI" beginning with the cell located immediately to the right of the intake opening 53. Similarly, the nozzle 76 shown in FIG. 6 may distribute miscella into six cells located to the right of the cell 57' so that the material is completely or nearly completely drained while passing through the remaining half of the stage V". Of course, it is equally possible to discharge miscella through the full length of the nozzle 76 shown in FIG. 6 since the material momentarily contained in the stage V" can discharge miscella in one of the lower stages IV"–I" before being evacuated into the conveyor 11". However, it is normally preferred to utilize a shorter arcuate nozzle 76a at least in the lowermost stage I" (FIG. 8) so that the material contained in the cells of this stage may discharge its liquid contents into the compartment 77 beneath the lowermost grate 62 before being evacuated through the opening 61. Thus, and as shown in FIG. 8, the arcuate spray nozzle 76a extends through about 180 degrees in a direction from the cell 78 which receives material from a selected cell in the second stage II". While passing through the right-hand half of the stage I", the lowermost cells 78 may discharge miscella into the compartment 77. Of course, the construction of the spray nozzles in the upper stages II"–VI" is preferably such that the discharge of miscella may be controlled as desired; for example, a section of each nozzle may be shut off from the source of miscella to prevent flooding.

The mantle 17" is provided with a requisite number of manholes 79 which provide access to the individual stages, with supply conduits 80 for conveying miscella to the spray nozzles 76, and with discharge conduits 81 which communicate with the compartments of the individual stages.

The operation of the extractor E" will be best understood by referring to FIG. 9 which shows schematically only such components which are necessary for the explanation of the operation. The solvent tank 20" communicates with a discharge conduit 82 leading to the suction side of a stage pump $P_1$ whose pressure side is connected with the supply conduit $80_1$ leading to the spray nozzle 76a in the lowermost stage I". The miscella dripping through the lowermost grate 62 is collected in the compartment 77 and passes through a discharge conduit $81_1$ to the suction side of a pump $P_2$ which delivers miscella through a supply conduit $80_2$ into the spray nozzle 76 located in the second stage II". The enriched miscella collected in the compartment 83 beneath the grate 84 in the second stage is delivered through a discharge conduit $81_2$, through a pump $P_3$ and through a supply conduit $80_3$ into the spray nozzle 76 of the third stage III" to accumulate in the compartment 85 beneath the grate 86 whence it is conveyed through the discharge conduit $81_3$, through the pump $P_4$ and through the supply conduit $80_4$ into the nozzle 76 of the fourth stage IV". The enriched miscella collected in the compartment 87 beneath the grate 88 of the fourth stage is conveyed through a discharge conduit $81_4$, through a pump $P_5$ and through a supply conduit $80_5$ into the spray nozzle 76 of the fifth stage V" which comprises a compartment 89 located beneath the perforated grate 59. The compartment 89 communicates with a discharge pipe $81_5$ leading to a pump $P_6$ which conveys miscella through a supply conduit $80_6$ into the nozzle 76 of the uppermost stage VI″. The finished miscella collecting in the compartment 90 of the uppermost stage is drawn through a discharge conduit $81_6$ to the suction side of a pump $P_7$ which conveys finished miscella through a supply conduit $80_7$ and into the miscella tank 50. In order to bring about a higher concentration of oil in the finished miscella, it is advisable to recirculate the miscella collecting in the compartment 90 by passing it through a discharge conduit $81_7$, through a further pump $P_8$ and through a supply conduit $80_8$ into a second spray nozzle 76b which delivers miscella into such cells of the uppermost stage VI″ which contain fresh, i.e. unwetted material.

In order to prevent a mixing of two differently concentrated bodies of miscella in the compartment 90 of the uppermost stage VI″, this compartment preferably comprises two separated sections 90a, 90b as is shown in FIG. 10. The miscella discharged by the nozzle 76b in the stage VI″ seeps through the material contained in the cells 54 which are close to the intake opening 53 so that the miscella collecting in the compartment section 90b contains a high percentage of oils.

It will be readily understood that the mixing of the processed material in the extractor E″ is much more thorough than in an extractor with a lesser number of stages, i.e. the extent of mixing is proportional with the number of stages. While the processing time is substantially the same, a say two-stage extractor may be manufactured at a somewhat lower cost than a six-stage extractor but the latter's mixing action is superior to that of a two-stage extractor.

FIG. 12 illustrates a preferred form of a perforated grate 7 which may be utilized in the multi-stage extractor of my invention. As shown, the grate is formed with vertical perforations each of which consists of a small diameter upper portion 95 and a downwardly and outwardly diverging portion 96. Such configuration of the perforations insures that the material is retained in the cells advancing above the grate 7 and that the miscella may be readily discharged into the compartments located beneath the grate. It will be noted that the smaller-diameter portions 95 of the apertures or perforations in the grate 7 are comparatively short which reduces the likelihood of clogging, especially since the lower portions 96 of the perforations diverge outwardly toward the underside of the grate.

As is shown in FIG. 11, the grate may consist of several sector-shaped sections each having an angular width corresponding to the width of a cell thereabove.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process for the continuous solvent extraction of oils and soluble substances from solid materials, said process comprising the steps of separately confining a series of beds of solid material in a plurality of superimposed stages and moving the beds of material in each of said stages in a predetermined direction and in a substantially circular horizontal path through less than 360 degrees; consecutively transferring upon termination of such movement the beds of material from a higher stage into the next lower stage; successively distributing solvent onto the beds of material in the lowermost stage for percolation therethrough collecting miscella along the path of movement of the beds of material in the lowermost stage; recirculating at least a portion of miscella into selected beds of material in the lowermost stage for percolation through said selected beds to obtain enriched miscella; collecting enriched miscella along the path of movement of said selected beds; recirculating at least a portion of enriched miscella in the beds of material in at least one stage above said lowermost stage for percolation through the beds of material in said one stage; collecting finished miscella along the path of movement of beds of material in said one stage; and withdrawing the collected finished miscella, whereby contact of said collected finished miscella with said first-mentioned miscella will be avoided.

2. A process for the continuous solvent extraction of oils and soluble substances from solid materials, said process comprising the steps of separately confining a series of beds of solid material in at least two superimposed stages and moving the beds in each of said stages in a predetermined direction and in a substantially circular horizontal path through less than 360 degrees; consecutively transferring upon termination of such movement the beds of material from the upper stage into the lower stage; successively distributing solvent onto the beds of material in the lower stage for percolation therethrough; collecting miscella along the path of movement of the beds of material in the lower stage; recirculating miscella onto the beds of material in the upper stage for percolation therethrough, collecting enriched miscella along the path of movement of the beds of material in the upper stage; and withdrawing the collected enriched miscella, whereby contact of said collected enriched miscella with said first-mentioned miscella will be avoided.

3. A process for the continuous solvent extraction of oils and soluble substances from solid materials, said process comprising the steps of separately confining a series of beds of solid material in two superimposed stages and moving the beds in substantially closed horizontal paths; successively distributing solvent onto the beds of material in the lower stage for percolation therethrough; collecting miscella along the path of movement of the beds of material in the lower stage; recirculating miscella in the beds of material in the lower stage in a direction counter to the path of movement of the beds of material in the lower stage for percolation through the beds of material in the lower stage to obtain enriched miscella; collecting enriched miscella along the path of movement of the beds of material in the lower stage; successively distributing enriched miscella onto the beds of material in the upper stage for percolation therethrough to obtain further enriched miscella; collecting the further enriched miscella along the path of movement of the beds of material in the upper stage; recirculating the further enriched miscella in the beds of material in the upper stage in directions of and counter to the path of movement of the beds of material in the upper stage for percolation through the beds of material in the upper stage; collecting finished miscella along the path of movement of the beds of material in the upper stage; and removing the finished miscella, whereby contact of said finished miscella with said first-mentioned miscella will be avoided.

4. A process for the continuous solvent extraction of oils and soluble substances from solid materials, said process comprising the steps of separately confining a series of beds of solid material in two superimposed stages and moving the beds in substantially closed horizontal paths; continuously evacuating beds of material from the upper stage into the lower stage and from the lower stage, respectively; continuously introducing beds of material into the upper stage; successively distributing solvent onto the beds of material in the lower stage for percolation therethrough; miscella along the path of movement of the beds of material in the lower stage; recirculating miscella in the beds of material in the lower stage for percolation therethrough to obtain enriched miscella; collecting enriched miscella along the path of movement of the beds of material in the lower stage; successively distributing enriched miscella onto the beds of material in the upper stage for percolation therethrough to obtain further enriched miscella; collecting the further enriched miscella along the path of movement of the beds of material in the upper stage; recirculating the further enriched miscella in the beds of material in the upper stage for percolation therethrough to obtain partly finished miscella; collecting said partly finished miscella along the path of movement of the beds of material in the upper stage; recirculating partly finished miscella through selected beds of material in the upper stage; recollecting finished miscella along the path of movement of said selected beds; and removing the finished miscella, whereby contact of said finished miscella with said first-mentioned miscella will be avoided.

5. A process for the solvent extraction of oils and soluble substances from solid materials, said process comprising the steps of separately confining a series of beds of solid material in at least three superimposed stages and moving the beds of material in each of said stages in a predetermined direction and in a substantially circular horizontal path through less than 360 degrees; consecutively transferring upon termination of such movement the beds of material from a higher stage into the next lower stage; successively contacting the beds of material in the lowermost stage with solvent for percolation therethrough to obtain initial miscella; successively contacting the beds of material in a higher stage with said initial miscella for percolation therethrough to obtain enriched miscella; successively contacting the beds of material in a still higher stage with said enriched miscella for percolation therethrough to obtain finished miscella; and withdrawing said finished miscella, whereby contact of said finished miscella with initial miscella will be avoided.

6. In a multi-stage solvent extractor, in combination, a substantially cylindrical upright housing having a central axis; a plurality of vertically spaced tier means arranged in said housing to rotate in a predetermined direction about said central axis and including uppermost tier means and lower tier means, each of said tier means being composed of a plurality of substantially sector-shaped cells having open lower ends and the cells of said lower tier means having open upper ends; a plurality of substantially horizontal stationary grates disposed in said housing at a plurality of vertically spaced levels, each of said grates being located beneath one of said tier means closely adjacent to the lower ends of the respective cells and each having an opening arranged within a limited sector-shaped portion of the respective grate, the opening in a grate which is located at a lower level being angularly displaced in said predetermined direction with reference to the opening in a grate which is located at the next higher level whereby extract-containing solid material which is fed into a cell of said uppermost tier means at a point ahead of the opening in the corresponding grate will move during rotation with the uppermost tier means toward and thereupon through the opening of the corresponding grate to enter a cell of the lower tier means and to move with the lower tier means toward and through the opening in the corresponding grate; and means for supplying solvent into the material which is contained in the cells of said tier means so that the solvent percolates through the material and through the corresponding grate.

7. A combination as set forth in claim 6, further comprising a stationary feeding station adjacent to said uppermost tier means and including means for introducing extract-containing solid material into such cells of said upper tier means which pass consecutively along said feeding station at a point ahead of the opening in the corresponding grate, and residue conveying means disposed beneath the opening of that grate which is located at the lowest level.

8. A combination as set forth in claim 6, further comprising solvent collecting means disposed in said housing beneath each of said grates.

9. A combination as set forth in claim 6, wherein each of said stationary grates has a plurality of perforations, each of said perforations comprising a smaller-diameter upper portion extending downwardly from the upper side of the respective grate and an outwardly and downwardly diverging lower portion communicating with said upper portion and extending to the underside of the respective grate.

10. A combination as set forth in claim 8, wherein the means for supplying solvent further comprises means for delivering solvent from a lower solvent collecting means to an upper solvent collecting means, and means for withdrawing solvent from such upper solvent collecting means.

11. A combination as set forth in claim 6, further comprising means for rotating said tier means including ring gear means secured to and disposed about each of said tier means, pinion means meshing with each of said ring gear means, and motor means for driving said pinion means.

12. A combination as set forth in claim 8, wherein each of said solvent collecting means comprises a plurality of sector-shaped compartments and wherein the angular width of each compartment at least equals the combined angular width of two cells in the respective tier means.

13. A combination as set forth in claim 8, wherein each of said solvent collecting means comprises a plurality of separate compartments and wherein the means for supplying solvent comprises means for introducing solvent into at least one cell of said lower tier means so that the solvent percolates through the material in said one cell and accumulates in the respective compartment therebelow, pump and conduit means for recirculating the solvent from said last mentioned compartment into at least one cell of said uppermost tier means, pump and conduit means for recirculating solvent from at least one compartment beneath each of said grates into at least one cell thereabove, and conduit means for withdrawing solvent from at least one compartment of the uppermost solvent collecting means.

14. A combination as set forth in claim 6, wherein the area of each of said openings approximates the cross sectional area of a cell and wherein the openings in superposed grates are angularly displaced with reference to each other through 360 degrees minus the angular width of a cell.

References Cited in the file of this patent

UNITED STATES PATENTS

| | | |
|---|---|---|
| 2,156,236 | Bonotto | Apr. 25, 1939 |
| 2,516,968 | Faler | Aug. 1, 1950 |
| 2,686,192 | Bonotto | Aug. 10, 1954 |
| 2,707,712 | Demper et al. | May 3, 1955 |
| 2,722,474 | Hanke et al. | Nov. 1, 1955 |
| 2,759,956 | Pominski et al. | Aug. 21, 1956 |
| 2,782,104 | Glinka | Feb. 19, 1957 |
| 2,811,539 | Karnofsky | Oct. 29, 1957 |
| 2,840,459 | Karnofsky | June 24, 1958 |
| 3,021,201 | Upton | Feb. 13, 1962 |